United States Patent
Uechi et al.

(10) Patent No.: US 11,418,038 B2
(45) Date of Patent: Aug. 16, 2022

(54) POWER GENERATION PLANT AND METHOD FOR OPERATING POWER GENERATION PLANT

(71) Applicant: MITSUBISHI HEAVY INDUSTRIES, LTD., Tokyo (JP)

(72) Inventors: Hideyuki Uechi, Tokyo (JP); Rikuma Shijo, Tokyo (JP); Kouji Horizoe, Tokyo (JP); Hisanobu Shinoda, Tokyo (JP); Mitsufumi Goto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 140 days.

(21) Appl. No.: 16/492,763

(22) PCT Filed: Mar. 23, 2018

(86) PCT No.: PCT/JP2018/011702
§ 371 (c)(1),
(2) Date: Sep. 10, 2019

(87) PCT Pub. No.: WO2018/174248
PCT Pub. Date: Sep. 27, 2018

(65) Prior Publication Data
US 2021/0143645 A1    May 13, 2021

(30) Foreign Application Priority Data
Mar. 24, 2017   (JP) .............................. JP2017-059285

(51) Int. Cl.
*H02J 3/38*      (2006.01)
*H02J 7/00*      (2006.01)
*H02P 27/06*     (2006.01)

(52) U.S. Cl.
CPC ............ *H02J 3/381* (2013.01); *H02J 7/0068* (2013.01); *H02P 27/06* (2013.01); *H02J 2300/24* (2020.01)

(58) Field of Classification Search
CPC ...................................................... H02J 3/381
See application file for complete search history.

(56) References Cited

U.S. PATENT DOCUMENTS 10,243,366 B2 *   3/2019   Biellmann ................ F01K 7/16
2002/0198648 A1  12/2002   Gilbreth et al.
(Continued)

FOREIGN PATENT DOCUMENTS

JP    2000-358329    12/2000
JP    2003-232228    8/2003
(Continued)

OTHER PUBLICATIONS

International Search Report dated Jun. 12, 2018 in International (PCT) Application No. PCT/JP2018/011702 with English translation.
(Continued)

*Primary Examiner* — Daniel Kessie
(74) *Attorney, Agent, or Firm* — Wenderoth, Lind & Ponack, L.L.P.

(57) ABSTRACT

A power generation plant includes a plant device, an AC motor for starting the plant device, at least one DC power source, and an inverter disposed between the at least one DC power source and the AC motor and between the at least one DC power source and an electrical power grid. The inverter is configured to convert DC power from the at least one DC power source to AC power and is capable of selectively supplying the AC power to the AC motor or the electrical power grid.

8 Claims, 5 Drawing Sheets

(56) References Cited

U.S. PATENT DOCUMENTS

| | | | |
|---|---|---|---|
| 2004/0080164 A1 | 4/2004 | McKelvey et al. | |
| 2005/0048334 A1 | 3/2005 | Sridhar et al. | |
| 2006/0022524 A1 | 2/2006 | Bryde et al. | |
| 2013/0127164 A1 | 5/2013 | Pena et al. | |
| 2014/0062425 A1* | 3/2014 | Harbourt | H02J 3/40 322/32 |
| 2014/0360188 A1 | 12/2014 | Harada et al. | |
| 2016/0036236 A1 | 2/2016 | Teichmann | |
| 2018/0034280 A1* | 2/2018 | Pedersen | H02J 3/32 |

FOREIGN PATENT DOCUMENTS

| | | |
|---|---|---|
| JP | 2013-110956 | 6/2013 |
| JP | 2013-140805 | 7/2013 |
| JP | 2016-31932 | 3/2016 |
| JP | 2016-46982 | 4/2016 |
| JP | 2016-220348 | 12/2016 |
| WO | 2011/114422 | 9/2011 |

OTHER PUBLICATIONS

International Preliminary Report on Patentability and Written Opinion of the International Searching Authority dated Oct. 3, 2019 in International (PCT) Application No. PCT/JP2018/011702 with English translation.
Extended European Search Report dated Aug. 28, 2020 in corresponding European Patent Application No. 18770554.6.

\* cited by examiner

POWER GENERATION PLANT AND METHOD FOR OPERATING POWER GENERATION PLANT

TECHNICAL FIELD

The present disclosure relates to a power generation plant and a method for operating a power generation plant.

BACKGROUND ART

A direct-current (DC) power source may be used as a power source of an electrical power grid.

For instance, WO 2011/114422 A discloses a power supply system with a DC power source including photovoltaic solar panels and batteries bundled by DC-coupling, which is a set of connection points, and connected to a commercial electrical power grid via an inverter.

SUMMARY

Problems to be Solved

Some plant devices (e.g., gas turbine, engine, boiler feedwater pump) of a power generation plant are driven by alternating-current (AC) motors for start-up. Such AC motors for starting plant devices can be adjusted in rotational speed by receiving supply of AC power with any frequency via an inverter.

However, since power supply to the AC motors for start-up is unnecessary during normal operation of the plant devices, the utilization rate of the inverter used for supplying power to the AC motors for start-up is low, and thus it is difficult to recover the installation cost of the inverter.

In this regard, WO 2011/114422 A does not disclose a configuration which enables a low cost power supply to the AC motors for starting plant devices of the power generation plant.

In view of the above, an object of at least one embodiment of the present invention is to provide a power generation plant and a method for operating a power generation plant whereby it is possible to supply electric power to an electric motor for starting a plant device at low cost.

Solution to the Problems (1) According to at least one embodiment of the present invention, a power generation plant comprises: a plant device; an AC motor for starting the plant device; at least one DC power source; and a first inverter disposed between the at least one DC power source and the AC motor and between the at least one DC power source and an electrical power grid. The first inverter is configured to convert DC power from the at least one DC power source to AC power and is capable of selectively supplying the AC power to the AC motor or the electrical power grid.

With the above configuration (1), DC power supplied from the DC power source is converted to AC power by the first inverter, and the AC power can be selectively supplied to the AC motor or the electrical power grid. Thus, it is possible to supply DC power from the first inverter to the AC motor at start-up of the plant device and to the electrical power grid at a time other than start-up of the plant device. By using a common inverter for supplying electric power to the AC motor for starting the plant device and for supplying electric power to the electrical power grid with a normal frequency different from the electric power supplied to the AC motor, it is possible to reduce the installation cost of the inverter. Consequently, it is possible to supply electric power to the motor for starting the plant device at low cost.

(2) In some embodiments, in the above configuration (1), the power generation plant further comprises: a first switch for switching a connection state between the first inverter and the electrical power grid; a rectifier, disposed between the at least one DC power source and the electrical power grid in parallel with the first inverter and the first switch, for converting AC power from the electrical power grid to DC power; and a second switch, disposed between the at least one DC power source and the electrical power grid in parallel with the first inverter and the first switch, for switching a connection state between the rectifier and the electrical power grid, and the at least one DC power source includes a secondary battery or an electrochemical fuel production power generation device configured to receive DC current from the rectifier.

With the above configuration (2), it is possible to supply electric power from the DC power source to the electrical power grid via the first inverter, and further it is possible, when electric power from the DC power source is not supplied to the electrical power grid, for instance, during a period with low power demand, to supply electric power from the electrical power grid to the secondary battery or the electrochemical fuel production power generation device via the rectifier to store electric power or produce fuel. Thus, it is possible to efficiently operate the power generation plant in accordance with power demand or the like.

(3) In some embodiments, in the above configuration (1) or (2), the power generation plant comprises: an AC generator connectable to the electrical power grid and configured to be driven by the plant device serving as a prime mover; and a rectifier, disposed between the at least one DC power source and the AC generator, for converting AC power from the AC generator to DC power, and the at least one DC power source includes a secondary battery or an electrochemical fuel production power generation device configured to receive DC power from the rectifier.

With the above configuration (3), it is possible to supply electric power generated by the AC generator driven by the plant device to the electrical power grid. On the other hand, when the AC generator is disconnected from the electrical power grid, it is possible to supply electric power from the AC generator to the secondary battery or the electrochemical fuel production power generation device via the rectifier to store electric power or produce fuel. For instance, it is possible to store electric power or produce fuel by using regenerative energy caused when the plant device (prime mover) is stopped. Thus, it is possible to efficiently operate the power generation plant in accordance with power demand or the like.

(4) In some embodiments, in any one of the above configurations (1) to (3), the power generation plant comprises a second inverter disposed between the at least one DC power source and the electrical power grid in parallel with the first inverter, and the second inverter is configured to convert DC power from the at least one DC power source to AC power and supply the AC power to a power demand part different from the AC motor while the first inverter supplies AC current to the AC motor.

With the above configuration (4), even when electric power is not supplied from the electrical power grid due to power cut or the like, it is possible to supply AC power with different frequencies to the AC motor for starting the plant device and to the power demand part (e.g., controller) necessary for operating the power generation plant, via the first inverter and the second inverter arranged in parallel. Thus, even when electric power is not supplied from the electrical power grid, it is possible to appropriately supply electric power to the AC motor and the power demand part, and it is possible to appropriately start the plant device.

(5) In some embodiments, in any one of the above configurations (1) to (4), the power generation plant comprises an AC generator connected to the electrical power grid and configured to be driven by the plant device serving as a prime mover, and the AC generator is configured to function as the AC motor for starting the prime mover.

With the above configuration (5), since the AC generator driven by the plant device (prime mover) can also be used as the AC motor for starting the plant device (prime mover), it is possible to reduce the installation cost and the installation area.

(6) In some embodiments, in any one of the above configurations (1) to (5), the power generation plant comprises an AC generator connected to the electrical power grid and configured to be driven by the plant device serving as a prime mover, and the AC generator is configured to be supplied with DC power from the at least one DC power source as excitation power of the AC generator.

With the above configuration (6), it is possible to supply DC power from the DC power source to the electrical power grid or the AC motor (only when the plant device is started), and further it is possible to supply DC power as excitation power from the DC power source to the AC generator driven by the plant device (prime mover) during operation of the plant device. Thus, it is possible to reduce the installation cost and the installation area of the power generation plant.

(7) In some embodiments, in any one of the above configurations (1) to (6), the AC generator is used as the AC motor.

With the above configuration (7), since the AC generator driven by the plant device (prime mover) is also used as the AC motor for starting the plant device (prime mover), it is possible to reduce the installation cost and the installation area.

(8) In some embodiments, in any one of the above configurations (1) to (7), the plant device includes a gas turbine, and the AC motor is configured to drive the gas turbine.

For appropriately starting the gas turbine, it is necessary to gradually increase the rotational speed of the AC motor for starting the gas turbine from zero.

In this regard, with the above configuration (8), at start-up of the gas turbine, it is possible to supply AC power to the motor via the first inverter while gradually increasing the frequency of the AC power from zero. Further, at a time other than start-up of the gas turbine, it is possible to supply AC power with a normal frequency to the electrical power grid via the first inverter. Consequently, it is possible to efficiently supply electric power to the motor for starting the plant device and to the electrical power grid with a reduced installation cost.

(9) In some embodiments, in the above configuration (8), the at least one DC power source includes a fuel cell including an anode, a cathode configured to be supplied with a gas containing carbon dioxide, and an electrolyte configured to transport a carbonate ion derived from the carbon dioxide from the cathode to the anode, and the cathode is configured to be supplied with an exhaust gas from the gas turbine as the gas containing the carbon dioxide.

With the above configuration (9), using DC power generated in the fuel cell, it is possible to start the gas turbine and supply electric power to the electrical power grid, and further it is possible to recover carbon dioxide contained in exhaust gas discharged from the gas turbine by using the fuel cell. Thus, it is possible to efficiently operate the power generation plant.

(10) In some embodiments, in any one of the above configurations (1) to (9), the power generation plant further comprises an electrochemical fuel production device disposed in parallel with the at least one DC power source.

With the above configuration (10), by supplying DC power to the electrochemical fuel production device disposed in parallel with the DC power source, it is possible to produce fuel by the electrochemical fuel production device. Thus, it is possible to efficiently operate the power generation plant.

(11) According to at least one embodiment of the present invention, a method for operating a power generation plant including a plant device, an AC motor, at least one DC power source, and a first inverter disposed between the at least one DC power source and the AC motor and between the at least one DC power source and an electrical power grid comprises: a step of generating DC power by the at least one DC power source; a step of converting the DC power to AC power by the first inverter; a step of supplying AC power from the first inverter to the AC motor and starting the plant device; and a step of supplying AC power from the first inverter to the electrical power grid during operation of the plant device after the plant device is started.

With the above method (11), DC power supplied from the DC power source is converted to AC power by the first inverter, and DC power from the first inverter is supplied to the AC motor at start-up of the plant device and to the electrical power grid at a time other than start-up of the plant device. By using a common inverter for supplying electric power to the motor for starting the plant device and for supplying electric power to the electrical power grid with a normal frequency different from the electric power supplied to the motor, it is possible to reduce the installation cost of the inverter. Consequently, it is possible to supply electric power to the motor for starting the plant device at low cost.

(12) In some embodiments, in the above method (11), the power generation plant further includes a rectifier disposed between the at least one DC power source and the electrical power grid in parallel with the first inverter, the at least one DC power source includes a secondary battery or an electrochemical fuel production power generation device, and the method includes: a step of converting DC power from the at least one DC power source to AC power by the first inverter and supplying the AC power to the electrical power grid during operation of the plant device; and a step of converting AC power from the electrical power grid to DC power by the rectifier and supplying the DC power to the secondary battery or the electrochemical fuel production power generation device when a power demand is below a specified value in the electrical power grid.

With the above method (12), it is possible to supply electric power from the DC power source to the electrical power grid via the first inverter, and further it is possible, when electric power from the DC power source is not supplied to the electrical power grid, for instance, during a period with low power demand, to supply electric power from the electrical power grid to the secondary battery or the electrochemical fuel production power generation device via the rectifier to store electric power or produce fuel. Thus, it is possible to efficiently operate the power generation plant in accordance with power demand or the like.

(13) In some embodiments, in the above method (11) or (12), the power generation plant includes an AC generator connected to the electrical power grid and driven by the plant device serving as a prime mover, and a rectifier disposed between the at least one DC power source and the AC generator, the at least one DC power source includes a secondary battery or an electrochemical fuel production power generation device, and the method includes: a step of disconnecting the AC generator from the electrical power grid; and a step of supplying regenerative power from the AC generator to the secondary battery or the electrochemical fuel production power generation device via the rectifier until the prime mover is stopped after the AC generator is disconnected.

With the above method (13), it is possible to supply electric power generated by the AC generator driven by the plant device to the electrical power grid. On the other hand, when the AC generator is disconnected from the electrical power grid, it is possible to supply electric power from the AC generator to the secondary battery or the electrochemical fuel production power generation device via the rectifier to store electric power or produce fuel. For instance, it is possible to store electric power or produce fuel by using regenerative energy caused when the plant device (prime mover) is stopped. Thus, it is possible to efficiently operate the power generation plant in accordance with power demand or the like.

(14) In some embodiments, in the above method (13), the at least one DC power source includes the secondary battery, and the method further includes a step of maintaining a free capacity for the regenerative power in the secondary battery during operation of the plant device.

With the above method (14), since the free capacity for regenerative power is maintained in the secondary battery during operation of the plant device, it is possible to recover regenerative power of the plant device to the secondary battery when the plant device is stopped.

(15) In some embodiments, in any one of the above methods (11) to (14), the power generation plant includes a second inverter disposed between the at least one DC power source and the electrical power grid in parallel with the first inverter, and the method further includes a step of converting DC power from the at least one DC power source to AC power by the second inverter and supplying the AC power to a power demand part different from the AC motor while the first inverter supplies AC current to the AC motor for staring the plant device.

With the above method (15), even when electric power is not supplied from the electrical power grid due to power cut or the like, it is possible to supply AC power with different frequencies to the AC motor for starting the plant device and to the power demand part (e.g., controller) necessary for operating the power generation plant, via the first inverter and the second inverter arranged in parallel. Thus, even when electric power is not supplied from the electrical power grid, it is possible to appropriately supply electric power to the AC motor and the power demand part, and it is possible to appropriately start the plant device.

(16) In some embodiments, in any one of the above methods (11) to (15), the at least one DC power source includes a secondary battery, and the method further includes a step of keeping the secondary battery storing a necessary amount of electric power for starting the plant device during operation of the plant device.

With the above method (16), since the secondary battery keeps storing the necessary amount of electric power for starting the plant device during operation of the plant device, even when electric power is not supplied from the electrical power grid due to power cut or the like, it is possible to restart the plant device.

(17) In some embodiments, in the above method (16), the at least one DC power source further includes one or more power sources other than the secondary battery, and the keeping step includes supplying electric power from the one or more power sources to the secondary battery so that the secondary battery stores the necessary amount of electric power for starting the plant device.

With the above method (17), by supplying electric power to the secondary battery from the one or more power sources, it is possible to keep the secondary battery storing the necessary amount of electric power for starting the plant device. Thus, it is possible to restart the plant device even when electric power is not supplied from the electrical power grid due to power cut or the like.

(18) In some embodiments, in the above method (17), the one or more power sources include a solar cell, and the method further includes: a step of predicting electric power generated by the solar cell; and a step of determining a power supply amount from the solar cell to the secondary battery in the keeping step, based on a prediction result in the predicting step.

With the above method (18), electric power in an amount determined based on the prediction result regarding power generated by the solar cell is supplied from the solar cell to the secondary battery to keep the storage amount in the secondary battery. Thus, it is possible to more reliably restart the plant device even when electric power is not supplied from the electrical power grid due to power cut or the like.

(19) In some embodiments, in any one of the above methods (11) to (16), the at least one DC power source includes a secondary battery and one or more power sources other than the secondary battery, and the step of starting the plant device includes supplying DC power from the one or more power sources to the AC motor via the first inverter in preference to DC power stored in the secondary battery.

With the above method (19), since DC power from the power source other than the secondary battery is supplied to the AC motor in preference to DC power stored in the secondary battery, it is possible to start the plant device with the secondary battery of lower capacity.

Advantageous Effects

At least one embodiment of the present invention provides a power generation plant and a method for operating a power generation plant whereby it is possible to supply electric power to an electric motor for starting a plant device at low cost.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

A power generation plant including a gas turbine as a plant device will now be described as embodiments of the present invention. However, the plant device of the power generation plant according to the present invention is not limited to a particular device. The plant device is any device driven by an AC motor, and may be, for instance, an engine or a boiler feedwater pump.

Figure 1:
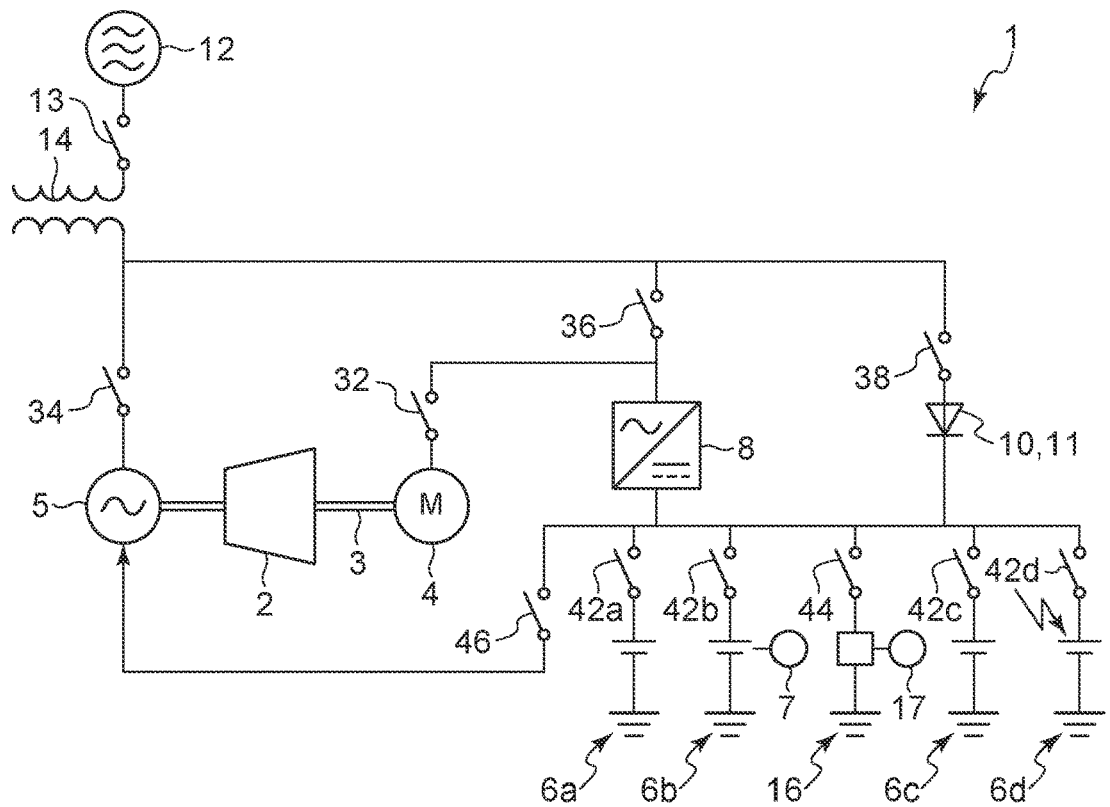
FIG. 1 is a schematic configuration diagram of a power generation plant according to an embodiment.
Figure 2:
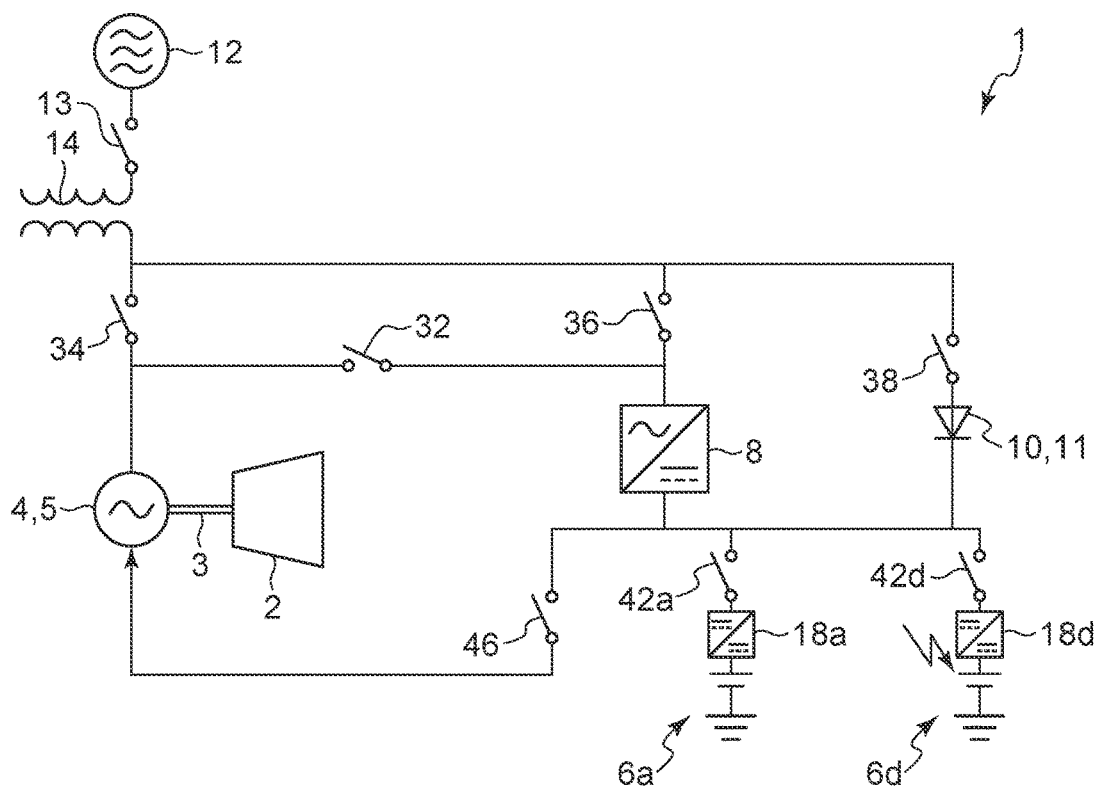
FIG. 2 is a schematic configuration diagram of a power generation plant according to an embodiment.
Figure 3:
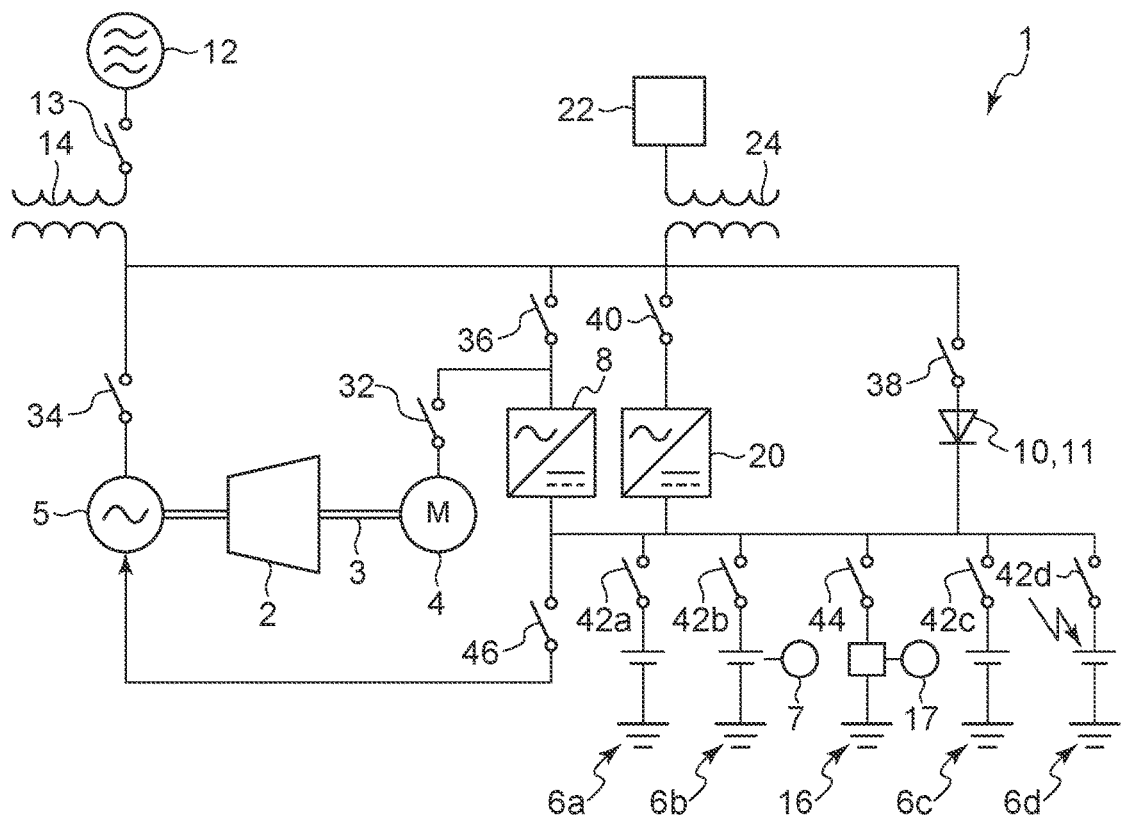
FIG. 3 is a schematic configuration diagram of a power generation plant according to an embodiment.

FIGS. 1 to 3 are a schematic configuration diagram of a power generation plant according to an embodiment. As shown in FIGS. 1 to 3, the power generation plant 1 includes a gas turbine 2 as the plant device, an AC motor 4 for starting the gas turbine 2 (plant device), at least one DC power source 6 (DC power sources 6a to 6d; hereinafter, also correctively referred to as DC power source 6), and a first inverter 8.

The power generation plant 1 can be connected to an electrical power grid 12 so that electric power is supplied from a power generation facility included in the power generation plant 1 to the electrical power grid 12, or electric power is received from the electrical power grid 12 to the power generation plant 1. Between the power generation plant 1 and the electrical power grid 12, a switch 13 and a transformer 14 are disposed. The switch 13 switches the connection state between the power generation plant 1 and the electrical power grid 12, and the transformer 14 adjusts the voltage of electric power which the power generation plant 1 supplies or receives to/from the electrical power grid 12.

The plant device is coupled to the AC motor 4 for start-up via a rotational shaft 3 and is configured to start when the rotational shaft is rotationally driven by the AC motor 4. The plant device may be an engine or a boiler feedwater pump other than the gas turbine 2 shown in FIGS. 1 to 3.

The plant device may function as a prime mover for driving a generator.

In the exemplary embodiments shown in FIGS. 1 to 3, an AC generator 5 is coupled to the gas turbine 2 (plant device), and the AC generator 5 is driven by the gas turbine 2 serving as the prime mover. The AC generator 5 can be connected to the electrical power grid 12, and a switch 34 disposed between the AC generator 5 and the electrical power grid 12 switches the connection state between the AC generator 5 and the electrical power grid 12.

In the exemplary embodiment shown in FIG. 2, the AC generator 5 coupled to the gas turbine 2 is configured to also function as the AC motor 4 for starting the gas turbine 2 (prime motor for driving the AC generator 5).

The AC generator 5 may have a rotor winding (field winding, not shown) rotating with the rotational shaft 3 of the gas turbine 2, and a stator winding (armature winding, not shown) connected to the transformer 14. In a case where the AC generator 5 functions as a generator for generating AC power, AC power is generated in the stator winding (armature winding) with rotation of the rotational shaft 3 of the gas turbine 2 upon supply of excitation current to the rotor winding (field winding). On the other hand, in a case where the AC generator 5 functions as the AC motor 4, when AC current is supplied to the rotor winding, a force acts on the rotor winding in response to the AC current and rotates the rotor winding. This rotates the rotational shaft 3 of the gas turbine 2 connected to the AC generator 5. Thus, the AC generator 5 may also function as the AC motor 4.

The DC power source 6 is a device capable of providing DC power and may include various batteries such as a primary battery, a secondary battery (storage battery), a fuel cell, or a solar battery, for instance.

The DC power source 6 may have a function of receiving and storing DC power.

Examples of such a DC power source 6 includes a secondary battery (storage battery).

Alternatively, the DC power source 6 may be an electrochemical fuel production power generation device having a function of receiving DC power and producing fuel. Examples of the electrochemical fuel production power generation device include solid oxide fuel cell and solid oxide electrolysis cell (SOEC/SOFC) capable of producing hydrogen (fuel) by electrolysis of water and generating electric power by consuming the hydrogen (fuel).

In the exemplary embodiments shown in FIGS. 1 and 3, the power generation plant 1 includes a secondary battery 6a, an electrochemical fuel production power generation device 6b, a fuel cell 6c, and a solar cell 6d. In the exemplary embodiment shown in FIG. 2, the power generation plant 1 includes a secondary battery 6a and a solar cell 6d.

As shown in FIGS. 1 and 3, the electrochemical fuel production power generation device 6b may be provided with a fuel storage part 7 for storing fuel produced in the electrochemical fuel production power generation device 6b.

The fuel produced in the electrochemical fuel production power generation device 6b may be, for instance, supplied to the fuel cell 6c which is the DC power source 6 or may be supplied to a device constituting the power generation plant 1 such as the gas turbine 2.

In addition, the power generation plant 1 may have an electrochemical fuel production device 16 disposed in parallel with the DC power source 6 and configured to receive DC power and produce fuel. The electrochemical fuel production device 16 may be provided with a fuel storage part 17 for storing fuel produced in the electrochemical fuel production device 16.

The fuel produced in the electrochemical fuel production device 16 may be, for instance, supplied to the fuel cell 6c which is the DC power source 6 or may be supplied to a device constituting the power generation plant 1 such as the gas turbine 2.

The first inverter 8 is disposed between the DC power source 6 and the AC motor 4 and between the DC power source 6 and the electrical power grid 12. Further, the first inverter 8 is configured to convert DC power supplied from the DC power source 6 to AC power and is capable of selectively supplying the AC power to the AC motor 4 or the electrical power grid 12.

More specifically, a switch 32 (first switch) is disposed between the first inverter 8 and the AC motor 4, and a switch 36 (first switch) is disposed between the first inverter 8 and the electrical power grid 12. These switches 32, 36 open and close a circuit to switch the connection state between the first inverter 8 and the AC motor 4 and the connection state between the first inverter 8 and the electrical power grid 12.

In this way, in the power generation plant 1 according to some embodiments, the first inverter 8 converts DC power supplied from the DC power source 6 to AC power, and the resulting AC power can be selectively supplied to the AC motor 4 or the electrical power grid 12. Thus, it is possible to supply DC power from the first inverter 8 to the AC motor at start-up of the gas turbine 2 (plant device) and to the electrical power grid 12 at a time other than start-up of the gas turbine 2 (plant device).

For instance, for starting the gas turbine 2 of plant device in a stopped state, AC power is supplied to the AC motor 4 for starting the plant device via the first inverter 8. For starting the gas turbine 2, it is necessary to gradually increase the rotational speed of the gas turbine 2 from zero to impart inertia energy to the gas turbine 2. Therefore, it is necessary to control the frequency of AC power supplied to the AC motor 4 so as to gradually increase the rotational speed of the AC motor 4 from zero. To appropriately supply AC power with a frequency suitable for starting the gas turbine 2 to the AC motor 4, the first inverter 8 adjusts the frequency of AC power supplied to the AC motor 4.

Once the rotational speed of the gas turbine 2 is increased to some extent, fuel is supplied to the gas turbine 2, and torque is imparted to the turbine by a combustion gas produced by combustion of the fuel to further increase the rotational speed of the gas turbine 2. When the rotational speed of the gas turbine 2 reaches a rotational speed (e.g., 3000 rpm or 3600 rpm) corresponding to the normal frequency (e.g., 50 Hz or 60 Hz) of the electrical power grid 12 (i.e., when it is synchronous with the grid frequency), the first inverter 8 and the AC motor 4 are disconnected to stop supply of electric power from the first inverter 8 to the AC motor 4. That is, supply of AC power via the first inverter 8 is generally unnecessary after the gas turbine 2 starts since the gas turbine 2 is driven by a combustion gas of fuel during normal operation (at operation).

Further, during a period other than start-up of the gas turbine 2 (for instance, during operation of the gas turbine 2), it is unnecessary to supply AC power from the first inverter 8 to the AC motor 4 for starting the plant device. Therefore, by adjusting AC power to the normal frequency (e.g., 50 Hz or 60 Hz) of the electrical power grid 12 in the first inverter 8, the AC power can be supplied to the electrical power grid 12.

Thus, in the power generation plant 1 according to the embodiments described above, by using a common inverter as the inverter (first inverter 8) for supplying electric power to the AC motor 4 for starting the plant device and the inverter (first inverter 8) for supplying electric power to the electrical power grid 12 with normal frequency different from the electric power supplied to the AC motor 4, it is possible to reduce the installation cost of the inverter. Consequently, it is possible to supply electric power to the AC motor 4 for starting the gas turbine 2 (plant device) at low cost.

Moreover, conventionally, electric power from an electrical power grid is used as electric power for driving an electric motor for starting a plant device. In this regard, in the power generation plant 1 according to the embodiments described above, since electric power for driving the AC motor 4 for starting the plant device is supplied from the DC power source 6, it is possible to start the plant device without consuming electric power from the electrical power grid 12 even if power demand is high.

In addition, as shown in FIGS. 1 to 3, between the first inverter 8 and each DC power source 6, a switch 42a to 42d (hereinafter, also collectively referred to as switch 42) for switching the connection state between each DC power source 6 and the first inverter 8 may be provided. Further, between the first inverter 8 and the electrochemical fuel production device 16, a switch 44 for switching the connection state between the electrochemical fuel production device 16 and the first inverter 8 may be provided.

Further, as shown in FIG. 2, between the first inverter 8 and the DC power source 6, a DC/DC converter 18a, 18d or the like (see FIG. 2) for converting the voltage of DC power may be provided. Further, although not depicted, between the first inverter 8 and the electrochemical fuel production device 16 (see FIGS. 1 and 3), a DC/DC converter for converting the voltage of DC power may be provided.

In some embodiments, as shown in FIGS. 1 to 3, the power generation plant 1 includes a rectifier 10 and a switch 38 (second switch). The rectifier 10 and the switch 38 (second switch) are disposed between the DC power source 6 and the electrical power grid 12 in parallel with the first inverter 8 and the switch 36 (first switch). The rectifier 10 is configured to convert AC power supplied from the electrical power grid 12 to DC power. Further, the switch 38 is configured to switch the connection state between the rectifier 10 and the electrical power grid 12. Further, the at least one DC power source 6 includes a secondary battery 6a or an electrochemical fuel production power generation device 6b configured to receive DC power from the rectifier 10.

By operating the switch 36 (first switch) and the switch 38 (second switch) so as to connect the first inverter 8 with the electrical power grid 12, it is possible to supply DC power supplied from the DC power source 6 including the secondary battery 6a or the electrochemical fuel production power generation device 6b to the electrical power grid 12 via the first inverter 8.

Further, by operating the switch 36 (first switch) and the switch 38 (second switch) so as to connect the rectifier 10 with the electrical power grid 12, it is possible to convert AC power supplied from the electrical power grid 12 to DC power by the rectifier 10 and supply the DC power to the DC power source 6 including the secondary battery 6a or the electrochemical fuel production power generation device 6b.

For instance, in a case where the secondary battery 6a receives DC power from the rectifier 10, electric power is stored in the secondary battery 6a. Meanwhile, in a case where the electrochemical fuel production power generation device 6b receives DC power from the rectifier 10, fuel is produced at the electrochemical fuel production power generation device 6b through electrolysis.

Thus, in the power generation plant 1 including the rectifier 10 and the switch 38 (second switch), it is possible to supply electric power from the DC power source 6 to the electrical power grid 12 via the first inverter 8 during a period with high power demand, and further it is possible to supply electric power from the electrical power grid 12 to the secondary battery 6a or the electrochemical fuel production power generation device 6b via the rectifier 10 to store electric power or produce fuel when electric power from the DC power source 6 is not supplied to the electrical power grid 12, for instance, during a period with low power demand. Thus, it is possible to efficiently operate the power generation plant 1 in accordance with power demand or the like.

In some embodiments, as shown in FIGS. 1 to 3, the power generation plant 1 includes a rectifier 11 disposed between the DC power source 6 and the AC generator 5. The rectifier 11 is configured to convert AC power supplied from the AC generator 5 to DC power. Further, the at least one DC power source 6 includes a secondary battery 6a or an electrochemical fuel production power generation device 6b configured to receive DC power from the rectifier 10.

In the exemplary embodiments shown in FIGS. 1 to 3, AC power from the AC generator 5 flows to the rectifier 11 via the switch 34 and the switch 38.

Further, in the exemplary embodiments shown in FIGS. 1 to 3, the rectifier 11 is the same as the rectifier 10.

Thus, in the power generation plant 1 including the rectifier 11, when the AC generator 5 is connected to the electrical power grid 12, it is possible to supply electric power generated by the AC generator 5 driven by the gas turbine 2 (plant device) as the prime mover to the electrical power grid 12. On the other hand, when the AC generator 5 is disconnected from the electrical power grid 12, it is possible to supply electric power from the AC generator 5 to the secondary battery 6a or the electrochemical fuel production power generation device 6b via the rectifier 11 and store electric power or produce fuel. For instance, when the gas turbine 2 (plant device) as the prime mover is stopped or deaccelerated, electric power (regenerative energy) generated by inertia energy of the rotor of the AC generator 5 can be used to store electric power or produce fuel. Thus, it is possible to efficiently operate the power generation plant 1 in accordance with power demand or the like.

In some embodiments, as shown in FIG. 3, the power generation plant 1 includes a second inverter 20 disposed between the DC power source 6 and the electrical power grid 12 in parallel with the first inverter 8. The second inverter 20 is configured to convert DC power supplied from the DC power source 6 to AC power and supply the AC power to a power demand part 22 different from the AC motor 4 during a period when the first inverter 8 supplies AC current to the AC motor 4. Here, the power demand part 22 may be an auxiliary machine including a control device or a pump (e.g., lubricant oil pump or cooling water pump) in the power generation plant 1, for instance.

Between the second inverter 20 and the power demand part 22, a switch 40 for switching the connection state between the second inverter 20 and the power demand part 22 and a transformer 24 for adjusting the voltage of electric power supplied to the power demand part 22 may be provided.

Thus, in the power generation plant 1 including the first inverter 8 and the second inverter 20, even when electric power is not supplied from the electrical power grid 12 due to power cut or the like, it is possible to simultaneously supply AC power with different frequencies to the AC motor 4 for starting the gas turbine 2 (plant device) and to the power demand part 22 necessary for operating the power generation plant 1, via the first inverter 8 and the second inverter 20 arranged in parallel. Thus, even when electric power is not supplied from the electrical power grid 12, it is possible to appropriately supply electric power to the AC motor 4 and the power demand part 22, and it is possible to appropriately start the gas turbine 2 (plant device).

Further, during a period other than start-up of the gas turbine 2 (for instance, during operation of the gas turbine 2), by operating the first inverter 8 and the second inverter 20 at the normal grid frequency, it is possible to supply electric power from the DC power source 6 to the electrical power grid 12 via the first inverter 8 and the second inverter 20. Thus, it is possible to increase the power supply amount from the power generation plant 1 to the electrical power grid 12.

In some embodiments, the AC generator 5 driven by the gas turbine 2 (plant device) serving as the prime mover may be a synchronous generator. In this case, DC power from the DC power source 6 may be supplied to the AC generator 5 as excitation power.

For instance, in the exemplary embodiments shown in FIGS. 1 to 3, DC power from the DC power source 6 may be supplied to the field winding (not shown) of the AC generator 5 as excitation power via a switch 46.

In this case, it is possible to supply DC power from the DC power source 6 to the electrical power grid 12 or the AC motor 4 (only when the plant device is started), and further it is possible to supply DC power as excitation power from the DC power source 6 to the AC generator 5 driven by the gas turbine 2 (plant device) serving as the prime mover during operation of the gas turbine 2 (plant device). Thus, it is possible to reduce the installation cost and the installation area of the power generation plant 1.

Figure 4:
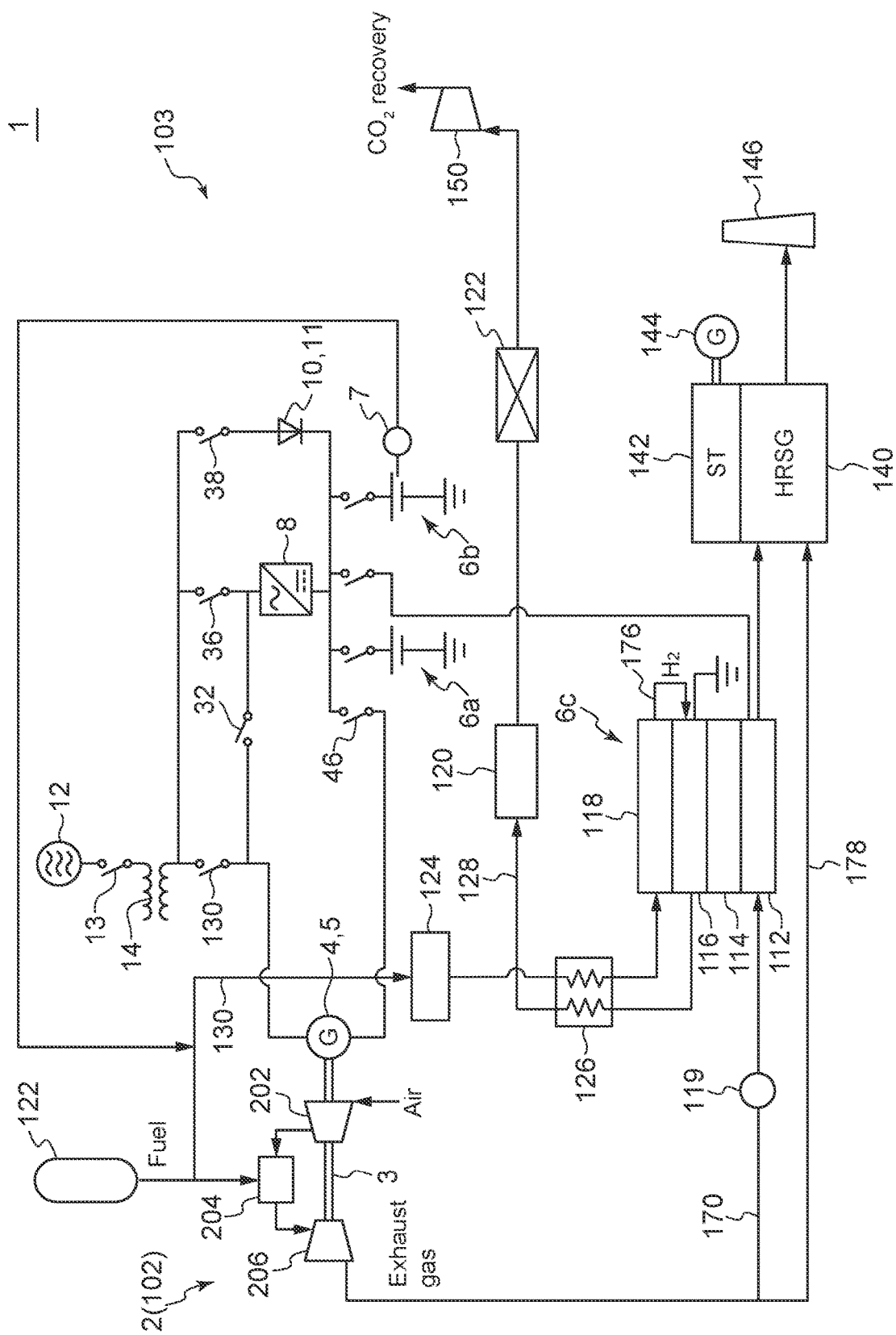
FIG. 4 is a schematic configuration diagram of a power generation plant according to an embodiment.

FIG. 4 is a schematic configuration diagram of a power generation plant according to an embodiment. The power generation plant 1 shown in FIG. 4 includes the gas turbine 2 as the plant device, and the AC generator 5 coupled to the gas turbine 2 (plant device) is driven by the gas turbine 2 serving as the prime mover. Further, the AC generator 5 also functions as the AC motor 4 for starting the gas turbine 2. The connection form of components of the power generation plant 1 shown in FIG. 2 is the same as in FIG. 2.

However, while the secondary battery 6a, the electrochemical fuel production power generation device 6b, and the fuel cell 6c are shown in FIG. 4 as the DC power source, other DC power source 6 (e.g., solar cell 6d) may be included, or the above-described electrochemical fuel production device 16 (see FIGS. 1 and 3) may be further included.

In the power generation plant 1 shown in FIG. 4, the fuel cell 6c includes an anode 116, a cathode 112 configured to be supplied with a gas containing carbon dioxide, and an electrolyte 114 configured to transport carbonate ions derived from the carbon dioxide from the cathode 112 to the anode 116. Further, the cathode 112 of the fuel cell 6c is supplied with exhaust gas from the gas turbine 2 as the gas containing carbon dioxide.

The power generation plant 1 shown in FIG. 4 will now be described more specifically.

As shown in FIG. 4, the power generation plant 1 is a thermal power generation plant including a thermal power generation device 102 including the gas turbine 2 and a carbon dioxide recovery system 103. The carbon dioxide recovery system 103 is configured to recover carbon dioxide ($CO_2$) contained in exhaust gas discharged from the thermal power generation device 102.

In the exemplary embodiments shown in FIG. 4, the thermal power generation device 102 is a power generation device which generates electric power by using a combustion gas of the gas turbine 2. In some embodiments, the thermal power generation device 102 may be a device other than the gas turbine which generates electric power by using a combustion gas or combustion heat produced by combustion of fuel. The thermal power generation device 102 may be, for instance, a power generation device including a boiler or a gas turbine or a power generation device such as a gas turbine combined cycle (GTCC) or an integrated coal gasification combined cycle (IGCC).

The carbon dioxide recovery system 103 is configured to recover $CO_2$ contained in exhaust gas including a combustion produced gas in the thermal power generation device 102. For instance, in a case where the thermal power generation device 102 includes a gas turbine or a boiler including a combustor, the carbon dioxide recovery system 103 may be configured to recover $CO_2$ contained in exhaust gas supplied from the boiler or the gas turbine. Alternatively, in a case where the thermal power generation device 102 includes a heat recovery steam generator (HRSG) for recovering heat of exhaust gas from the gas turbine or the like, the carbon dioxide recovery system 103 may be configured to recover $CO_2$ contained in exhaust gas supplied from the heat recovery steam generator.

In the exemplary embodiment shown in FIG. 4, the thermal power generation device 102 is a thermal power generation device including the gas turbine 2. In the embodiment shown in FIG. 4, the carbon dioxide recovery system 103 is configured to recover $CO_2$ contained in exhaust gas supplied from the gas turbine 2.

The gas turbine 2 shown in FIG. 4 includes a compressor 202 for compressing air, a combustor 204 for burning fuel (e.g., natural gas) to produce a combustion gas, and a turbine 206 configured to be rotationally driven by the combustion gas.

The fuel (e.g., natural gas) is supplied from a fuel storage part 122 to the combustor 204. Further, the air compressed by the compressor 202 is fed to the combustor 204. The compressed air serves as an oxidant when the fuel is burned in the combustor 204.

To the turbine 206, the AC generator 5 is connected via the rotational shaft 3, so that the AC generator 5 is driven by rotational energy of the turbine 206 to generate electric power. The combustion gas used in the turbine 206 is discharged from the turbine 206 as exhaust gas.

In the exemplary embodiment shown in FIG. 4, the carbon dioxide recovery system 103 is configured to recover $CO_2$ contained in exhaust gas discharged from the thermal power generation device 102.

The fuel cell 6c includes the cathode 112, the anode 116, and the electrolyte 114 disposed between the cathode 112 and the anode 116. The cathode 112 of the fuel cell 6c is supplied with exhaust gas containing $CO_2$. The electrolyte 114 is configured to transport carbonate ions ($CO_3^{2-}$) derived from $CO_2$ contained in exhaust gas from the cathode 112 to the anode 116.

The fuel cell 6c may be a molten carbonate fuel cell (MCFC) using carbonate as the electrolyte 114. The carbonate used as the electrolyte 114 may be for instance lithium carbonate, sodium carbonate, or potassium carbonate or may be a mixture thereof.

The cathode 112 is provided with exhaust gas containing $CO_2$ from the thermal power generation device 102 via a cathode inlet passage 170.

The anode 116 is connected to a fuel storage part 122 storing fuel (e.g., natural gas) via the anode inlet passage 176 and a fuel supply line 130. The fuel in the fuel storage part 122 is reformed to hydrogen ($H_2$) by, for instance, a pre-reformer 124 disposed on the fuel supply line 130 and a reformation part 118 disposed on the fuel cell 6c and is supplied to the anode 116 via the anode inlet passage 176.

In the cathode 112 of the fuel cell 6c, $CO_2$ and oxygen ($O_2$) contained in exhaust gas from the thermal power generation device 102 react with electrons to produce carbonate ions ($CO_3^{2-}$). The carbonate ions produced at the cathode 112 move through the electrolyte 114 toward the anode 116.

On the other hand, in the anode 116 of the fuel cell 6c, hydrogen ($H_2$) supplied via the anode inlet passage 176 reacts with the carbonate ions ($CO_3^{2-}$) coming through the electrolyte 114 to produce water ($H_2O$), $CO_2$, and electrons.

In this way, $CO_2$ supplied to the cathode 112 moves through the electrolyte 114 from the cathode 112 to the anode 116 in the form of carbonate ions and becomes $CO_2$ by the reaction at the anode 116.

$CO_2$ produced at the anode 116 flows out to an anode outlet passage 128 as a mixed gas (outlet gas of the anode 116) together with $H_2O$ and unreacted components (e.g., CO and $H_2$) of the fuel gas. The anode outlet gas flowing to the anode outlet passage 128 is a $CO_2$-rich gas having a higher $CO_2$ concentration than exhaust gas to be treated. $CO_2$ contained in the $CO_2$-rich gas discharged from the anode 116 is recovered via the anode outlet passage 128. $CO_2$ thus recovered via the anode outlet passage 128 may be compressed by a compressor 150.

Incidentally, the reforming reaction of fuel is an endothermic reaction and thus usually needs heat from the outside. In view of this, as shown in FIG. 4, a heat exchanger 126 may be disposed upstream of the reformation part 118 to heat the fuel supplied to the reformation part 118 via the fuel supply line 130. By supplying the fuel heated with the heat exchanger 126 to the reformation part 118, it is possible to efficiently reform the fuel.

In the embodiment shown in FIG. 4, the heat exchanger 126 is configured to heat the fuel supplied from the fuel supply line 130 to the reformation part 118 through heat exchange with the outlet gas ($CO_2$-rich gas) of the anode 116.

A molten carbonate fuel cell works at a high temperature of about 600° C. to 700° C., and the gas flowing out of the anode 116 has nearly the same high temperature. Thus, with the above-described heat exchanger 126, it is possible to make use of reaction heat caused in the fuel cell 6c to reform the fuel.

Further, in the embodiment shown in FIG. 4, a combustor 119 for combusting fuel (for instance, fuel from the fuel storage part 122) is disposed on the cathode inlet passage 170.

For appropriately operating the fuel cell 6c, it is often desired that exhaust gas supplied thereto is at high temperature to some extent. In this case, by combusting fuel at the combustor 119 and heating exhaust gas on the inlet side of the cathode 112 by combustion heat, it is possible to easily and appropriately operate the fuel cell 6c.

In the exemplary embodiment shown in FIG. 4, the anode outlet passage 128 is provided with a CO shift reactor 120 for converting CO contained in the $CO_2$-rich gas. The CO shift reactor 120 is configured to convert CO contained in the $CO_2$-rich gas into $CO_2$ by reaction with water ($H_2O$), for instance.

By converting CO with the CO shift reactor 120, it is possible to make $CO_2$ concentration of the anode outlet passage 128 downstream of the CO shift reactor 120 higher than upstream of the CO shift reactor 120. Thereby, it is possible to recover carbon dioxide at higher purity.

Further, in the exemplary embodiment shown in FIG. 4, the anode outlet passage 128 is provided with a $CO_2$ separator 122 for separating $CO_2$ from the $CO_2$-rich gas. By separating $CO_2$ from the $CO_2$-rich gas with the $CO_2$ separator 122, it is possible to further increase the $CO_2$ concentration downstream of the $CO_2$ separator 122, and it is possible to recover carbon dioxide at higher purity.

A flammable component such as $H_2$ or CO contained in the remaining gas of the $CO_2$ rich gas from which $CO_2$ is separated by the $CO_2$ separator 122 may be supplied to the anode 116 of the fuel cell 6c via the anode inlet passage 176.

In some embodiments, as shown in FIG. 4, exhaust gas from the thermal power generation device 102 may be supplied to the cathode 112 of the fuel cell 6c and also supplied to a heat recovery steam generator 140 via a bypass passage 178 diverging from the cathode inlet passage 170.

The heat recovery steam generator 140 shown in FIG. 4 includes a duct (not shown) to which exhaust gas from the thermal power generation device 102 is introduced and a heat exchanger (not shown) disposed on the duct. The heat exchanger is configured to generate steam by heat exchange with exhaust gas flowing through the duct. The steam generated at the heat recovery steam generator 140 is introduced to a steam turbine 142 and rotationally drive the steam turbine 142. To the steam turbine 142, a generator 144 is connected, so that the generator 144 is rotationally driven by the steam turbine 142 to generate electric power.

In the exemplary embodiment shown in FIG. 4, exhaust gas flowing through the duct of the heat recovery steam generator 140 and passing through the heat exchanger is discharged from a stack 146.

In the power generation plant 1 according to the above-described embodiment, using DC power generated in the fuel cell 6c, it is possible to start the gas turbine 2 and supply electric power to the electrical power grid 12, and further it is possible to recover carbon dioxide contained in exhaust gas discharged from the gas turbine 2 by using the fuel cell 6c. Thus, it is possible to efficiently operate the power generation plant 1.

In addition, as shown in FIG. 4, the fuel (e.g., hydrogen) produced in the electrochemical fuel production power generation device 6b (or electrochemical fuel production device 16 not shown) may be supplied to the anode 116 of the fuel cell 6c via the fuel supply line 130 and the anode inlet passage 176, or the fuel may be supplied to the combustor 204 of the gas turbine 2 or the combustor 119 disposed on the cathode inlet passage 170 via a passage not depicted.

Figure 5:
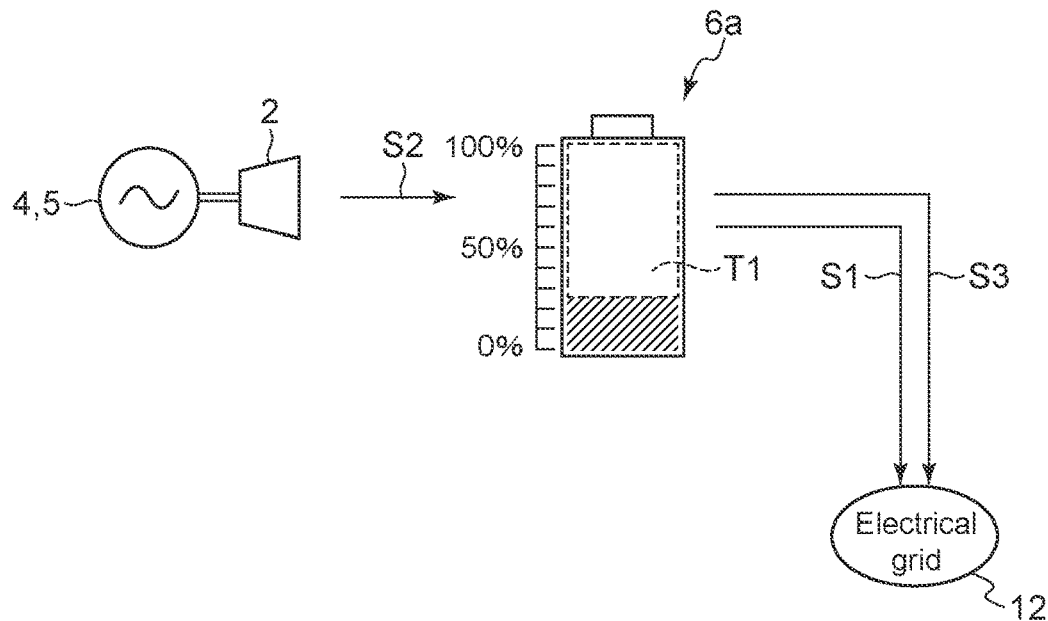
FIG. 5 is a diagram for describing a method for operating a power generation plant according to an embodiment.
Figure 6:
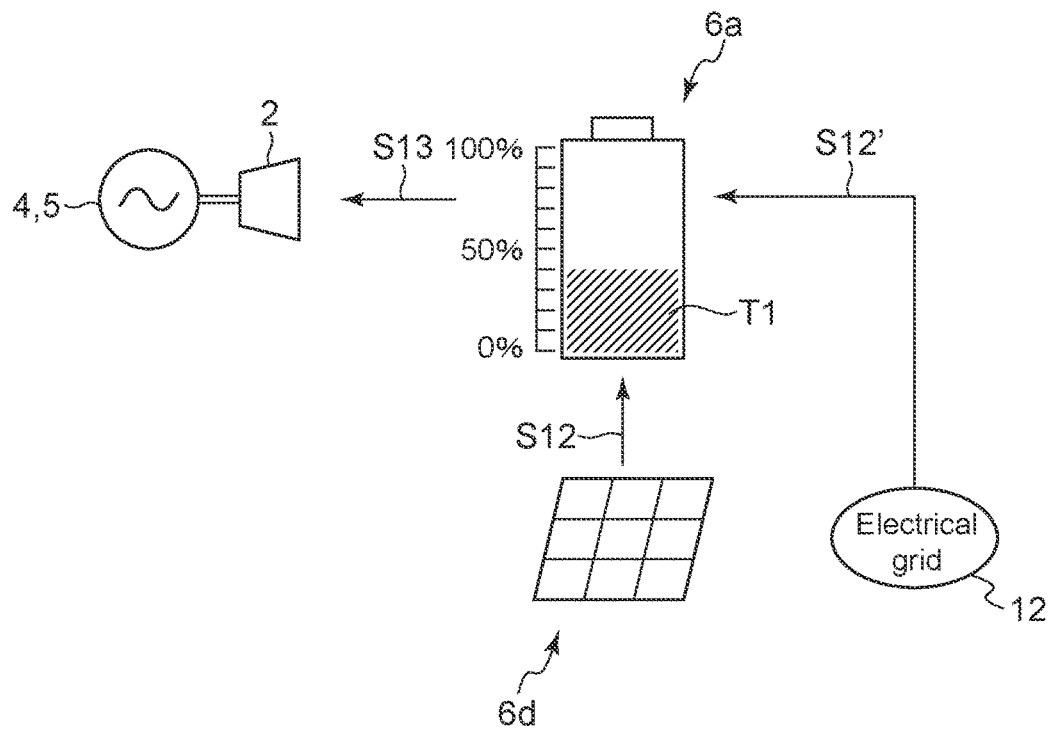
FIG. 6 is a diagram for describing a method for operating a power generation plant according to an embodiment.
Figure 7:
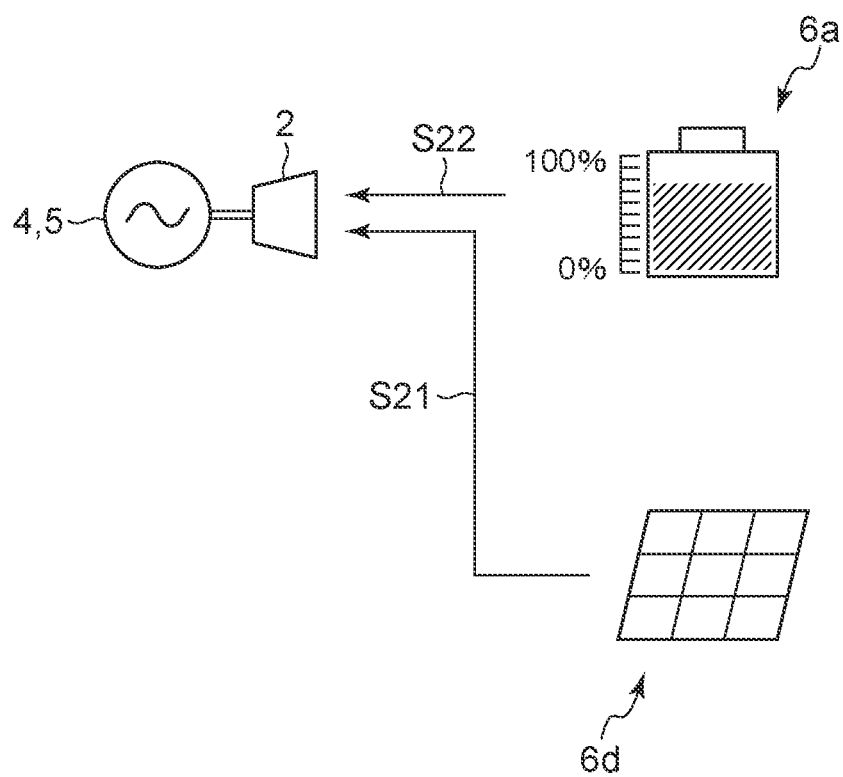
FIG. 7 is a diagram for describing a method for operating a power generation plant according to an embodiment.

FIGS. 5 to 7 are a diagram for describing a method for operating the power generation plant 1 (see FIGS. 1 to 3, for instance) according to some embodiments described above. In FIGS. 5 to 7, the power generation plant 1 is not depicted, and only a part of components (e.g., gas turbine 2, AC motor 4, AC generator 5, secondary battery 6a) of the power generation plant 1 is depicted.

Further, in the following, the method for operating the power generation plant 1 according to some embodiments will be described in conjunction with a case where the method is applied to the power generation plant 1 including at least the secondary battery 6a, the same operation method may be applied to the power generation plant 1 including the electrochemical fuel production power generation device 6b. In FIGS. 5 to 7, the hatched portion in the secondary battery 6a indicates power stored in the secondary battery 6a.

FIG. 5 is a diagram showing the method for operating the power generation plant 1 in a case where regenerative energy is recovered when the gas turbine 2 (plant device) as the prime mover is stopped.

In a case where regenerative energy is recovered when the gas turbine 2 is stopped, first, the AC generator 5 driven by the gas turbine 2 (prime mover) is disconnected from the electrical power grid 12. Then, after the AC generator 5 is disconnected from the electrical power grid 12, until the gas turbine 2 (prime mover) is stopped, regenerative power from the AC generator 5 is supplied to the secondary battery 6a via the rectifier 10.

Thus, when the gas turbine 2 (plant device) as the prime mover is stopped or deaccelerated, electric power (regenerative energy) generated by inertia energy of the rotor of the AC generator 5 can be used to store electric power or produce fuel.

In some embodiments, before the gas turbine 2 is stopped as described above, a free capacity for storing regenerative power is maintained in the secondary battery 6a during operation of the gas turbine 2.

When described with reference to FIG. 5, during operation of the gas turbine 2, in order to keep a free capacity T1 for regenerative power in the secondary battery 6a, for instance, if the free capacity T1 is smaller than regenerative power, electric power stored in the secondary battery 6a is supplied to the electrical power grid 12 to ensure the free capacity for regenerative power in the secondary battery 6a (S1). Then, after the AC generator 5 is disconnected from the electrical power grid 12, until the gas turbine 2 is stopped, regenerative power from the AC generator 5 is supplied to the secondary battery 6a via the rectifier 10 (S2).

Thus, by maintaining the free capacity T1 for regenerative power in the secondary battery 6a during operation of the gas turbine 2 (plant device), it is possible to recover regenerative power generated in the AC generator 5 to the secondary battery when the gas turbine 2 (plant device) is stopped.

If the free capacity of the secondary battery 6a falls below the regenerative power before the gas turbine 2 is stopped, electric power may be supplied from the secondary battery 6a to the electrical power grid 12 (S3).

FIG. 6 is a diagram showing the method for operating the power generation plant 1 when the gas turbine 2 (plant device) is started in a case where electric power is not supplied from the electrical power grid 12 due to power cut or the like. The operation method described with reference to FIG. 6 is applied to the power generation plant 1 including the second inverter 20 disposed between the DC power source 6 including the secondary battery 6a and the electrical power grid 12 in parallel with the first inverter 8, as shown in FIG. 3.

When electric power is not supplied from the electrical power grid 12 due to power cut or the like, DC power from the DC power source 6 is supplied to the AC motor 4 for starting the plant device via the first inverter 8. While DC power from the DC power source 6 is supplied to the AC motor 4 for starting the plant device via the first inverter 8, DC power from the DC power source 6 is supplied to the power demand part 22 (e.g., control device or pump; see FIG. 3) via the second inverter 20.

Thus, even when electric power is not supplied from the electrical power grid 12, it is possible to simultaneously supply AC power with different frequencies to the AC motor 4 for starting the gas turbine 2 (plant device) and to the power demand part 22 necessary for operating the power generation plant 1, via the first inverter 8 and the second inverter 20 arranged in parallel. Thus, even when electric power is not supplied from the electrical power grid 12, it is possible to appropriately supply electric power to the AC motor 4 and the power demand part 22, and it is possible to appropriately start the gas turbine 2 (plant device).

In some embodiments, during operation of the gas turbine 2 (plant device), the secondary battery 6a keeps storing the necessary amount of power for starting the gas turbine 2.

When described with reference to FIG. 6, before electric power is not supplied from the electrical power grid 12 due to power cut or the like, i.e., in a state where electric power can be supplied from the electrical power grid 12, if necessary, electric power is supplied to the secondary battery 6a from one or more power sources (solar cell 6d in the example shown in FIG. 6) other than the secondary battery 6a so that the secondary battery 6a keeps storing the necessary amount of power T2 for starting the gas turbine 2 (S12). To keep the secondary battery 6a with the necessary amount of power T2 for starting the gas turbine 2, in addition to supply of electric power to the secondary battery 6a from one or more power sources other than the secondary battery 6a, electric power may be supplied from the electrical power grid 12 to the secondary battery 6a via the rectifier 10 (S12').

With this step, since the secondary battery 6a keeps storing the necessary amount of power T2 for starting the gas turbine 2 (plant device), even when electric power is not supplied from the electrical power grid 12 due to power cut or the like, it is possible to supply electric power stored in the secondary battery 6a to the AC motor 4 via the first inverter 8 and restart the gas turbine 2 (plant device) (S13).

In some embodiments, as shown in FIG. 6, the "one or more power sources other than the secondary battery 6a" is the solar cell 6d. Further, electric power generated by the solar cell 6d is predicted, and power supply amount from the solar cell 6d to the secondary battery 6a is determined in step S12 on the basis of the prediction result. Further, in step S12, electric power in the supply amount thus determined is supplied from the solar cell 6d to the secondary battery 6a.

The electric power generated by the solar cell 6d varies with season, time, weather, or the like. Therefore, by determining power supply amount from the solar cell 6d to the secondary battery 6a based on the predicted power and also determining power supply amount from the other power source (e.g., electrical power grid 12, DC power source 6 other than secondary battery 6a and solar cell 6d) to the secondary battery 6a, it is possible to appropriately keep the storage in the secondary battery 6a.

For instance, in a time period when electric power generated by the solar cell 6d is predicted to reach the necessary amount T2 for starting the gas turbine 2 (plant device), electric power is supplied from the solar cell 6d to the secondary battery 6a.

Meanwhile, in a time period when electric power generated by the solar cell 6d is predicted not to reach the necessary amount T2 for starting the gas turbine 2 (plant device), electric power is supplied from the solar cell 6d to the secondary battery 6a, and the shortage of the necessary amount T2 of electric power is supplied to the secondary battery 6a, for instance, by electric power from the electrical power grid 12.

Thus, it is possible to more reliably restart the plant device even when electric power is not supplied from the electrical power grid due to power cut or the like.

A method for predicting electric power generated by the solar cell 6d can be known from descriptions of "photovoltaic output prediction technology development and verification ex-post evaluation report" (2015, November, Technology Development and Innovation Subcommittee, Industrial Science and Technology Policy and Environment Committee, Industrial Structure Council, Ministry of Economy, International Trade and Industry), for instance.

FIG. 7 is a diagram showing the method for operating the power generation plant 1 (see FIGS. 1 to 3) including the secondary battery 6a and one or more power sources (solar cell 6d in the example shown in FIG. 7) other than the secondary battery as the DC power source 6.

In some embodiments, for starting the gas turbine 2 by the AC motor 4, DC power from the solar cell 6d (one or more power sources other than secondary battery 6a) is supplied to the AC motor 4 via the first inverter 8 in preference to DC power stored in the secondary battery 6a.

When described with reference to FIG. 7, for starting the gas turbine 2 by the AC motor 4, DC power from the solar cell 6d is supplied to the AC motor 4 via the first inverter 8 in preference to the secondary battery 6a (S21). Further, if electric power from the secondary battery 6a is not enough for the entire necessary amount of power for starting the AC motor 4, the shortage of electric power is supplied from the secondary battery 6a to the AC motor 4 via the first inverter 8 (S22).

Thus, by supplying DC power from the power source (solar cell 6d in the above example) other than the secondary battery 6a to the AC motor 4 in preference to DC power stored in the secondary battery 6a, it is possible to start the gas turbine 2 (plant device) with the secondary battery 6a of lower capacity.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, herein, if voltage needs to be converted, a transformer may be added to the AC circuit, and a DC/DC converter may be added to the DC circuit, as appropriate. Further, the transformer and the DC/DC converter described herein may be removed if not necessary. The presence or absence and the positional relationship of the transformer and the DC/DC converter are irrelevant to the technical scope of the present invention.

REFERENCE SIGNS LIST

1 Power generation plant
2 Gas turbine
3 Rotational shaft
4 AC motor
5 AC generator
6 DC power source
6a Secondary battery
6b Electrochemical fuel production power generation device
6c Fuel cell
6d Solar cell
7 Fuel storage part
8 First inverter
10 Rectifier
11 Rectifier
12 Electrical power grid
13 Switch
14 Transformer
16 Electrochemical fuel production device
17 Fuel storage part
18a, 18d DC/DC converter
20 Second inverter 22 Power demand part
24 Transformer
32, 34, 36, 38, 40, 42 (42a to 42d), 44, 46 Switch
102 Thermal power generation device
103 Carbon dioxide recovery system
112 Cathode
114 Electrolyte
116 Anode
118 Reformation part
119 Combustor
120 CO shift reactor
122 Fuel storage part
124 Pre-reformer
126 Heat exchanger
128 Anode outlet passage
130 Fuel supply line
140 Heat recovery steam generator
142 Steam turbine
144 Generator
146 Stack
150 Compressor
170 Cathode inlet passage
176 Anode inlet passage
178 Bypass passage
202 Compressor
204 Combustor
206 Turbine

The invention claimed is:

1. A power generation plant comprising:
a plant device;
an AC motor for starting the plant device;
an AC generator configured to be driven by the plant device as a prime mover and to be connectable to an electrical power grid;
at least one DC power source;
an inverter disposed between the at least one DC power source and the AC motor and between the at least one DC power source and the electrical power grid;
a rectifier, disposed between the at least one DC power source and the AC generator, for converting AC power from the AC generator to DC power;
a first electric power line connecting the at least one DC power source and the inverter;
a second electric power line connecting the inverter and the AC motor;
a rotational shaft connecting the AC motor, the prime mover and the AC generator;
a third electric power line connecting the AC generator and the electrical power grid;
a fourth electric power line branching from the third electric power line and extending to the rectifier; and
a fifth electric power line connecting the rectifier and the at least one DC power source,
wherein:
the inverter is configured to convert DC power from the at least one DC power source to AC power and is capable of selectively supplying the AC power to the AC motor or the electrical power grid;
the at least one DC power source includes a secondary battery or an electrochemical fuel production power generation device configured to receive DC power from the rectifier; and
the inverter is configured to supply the AC power to the AC motor while increasing a frequency of the AC power at start-up of the plant device, and supply the AC power with a normal frequency to the electrical power grid during a period other than start-up of the plant device.

2. The power generation plant according to claim 1, further comprising:
a first switch for switching a connection state between the inverter and the electrical power grid;
the rectifier being disposed between the at least one DC power source and the electrical power grid in parallel with the inverter and the first switch, for converting AC power from the electrical power grid to DC power; and
a second switch, disposed between the at least one DC power source and the electrical power grid in parallel with the inverter and the first switch, for switching a connection state between the rectifier and the electrical power grid.

3. The power generation plant according to claim 1, wherein:
the inverter is a first inverter and the power generation plant further includes a second inverter disposed between the at least one DC power source and the electrical power grid in parallel with the first inverter; and
the second inverter is configured to convert DC power from the at least one DC power source to AC power, and supply the AC power to a power demand part different from the AC motor while the first inverter supplies AC power to the AC motor.

4. The power generation plant according to claim 1, wherein the AC generator is configured to function as the AC motor for starting the prime mover.

5. The power generation plant according to claim 1, wherein the AC generator is configured to be supplied with DC power from the at least one DC power source as excitation power of the AC generator.

6. The power generation plant according to claim 4, wherein the AC generator is used as the AC motor.

7. The power generation plant according to claim 1, wherein:
the plant device includes a gas turbine; and
the AC motor is configured to drive the gas turbine.

8. The power generation plant according to claim 7, wherein:
the at least one DC power source includes a fuel cell including an anode, a cathode configured to be supplied with a gas containing carbon dioxide, and an electrolyte configured to transport a carbonate ion derived from the carbon dioxide from the cathode to the anode; and
the cathode is configured to be supplied with an exhaust gas from the gas turbine as the gas containing the carbon dioxide.

* * * * *